US012196378B2

(12) United States Patent
Gregianin et al.

(10) Patent No.: US 12,196,378 B2
(45) Date of Patent: Jan. 14, 2025

(54) LAMP

(71) Applicant: OSRAM GmbH, Munich (DE)

(72) Inventors: Francesco Gregianin, Venice (IT); Mattia Mosolo, Marcon (IT)

(73) Assignee: OSRAM GmbH, Munich (DE)

( * ) Notice: Subject to any disclaimer, the term of this patent is extended or adjusted under 35 U.S.C. 154(b) by 0 days.

(21) Appl. No.: 18/256,095

(22) PCT Filed: Feb. 10, 2022

(86) PCT No.: PCT/IB2022/051196
§ 371 (c)(1),
(2) Date: Jun. 6, 2023

(87) PCT Pub. No.: WO2022/180474
PCT Pub. Date: Sep. 1, 2022

(65) Prior Publication Data

US 2024/0035633 A1 Feb. 1, 2024

(30) Foreign Application Priority Data

Feb. 25, 2021 (IT) ........................ 102021000004478

(51) Int. Cl.
*F21K 9/68* (2016.01)
*F21K 9/232* (2016.01)
*F21K 9/235* (2016.01)
*F21S 43/14* (2018.01)
*F21S 43/19* (2018.01)

(52) U.S. Cl.
CPC ................ *F21K 9/68* (2016.08); *F21K 9/232* (2016.08); *F21K 9/235* (2016.08); *F21S 43/14* (2018.01); *F21S 43/195* (2018.01)

(58) Field of Classification Search
CPC .. F21K 9/68; F21K 9/232; F21K 9/235; F21S 43/14; F21S 43/195; F21Y 2115/10; F21V 7/0016
See application file for complete search history.

(56) References Cited

U.S. PATENT DOCUMENTS 5,160,200 A 11/1992 Cheselske
8,556,473 B2 10/2013 Li et al.
2011/0233578 A1 9/2011 Hashimoto et al.
(Continued)

FOREIGN PATENT DOCUMENTS

DE 202012012007 U1 1/2013
EP 2933552 A1 10/2015
(Continued)

*Primary Examiner* — Elmito Breval
(74) *Attorney, Agent, or Firm* — Slater Matsil, LLP

(57) ABSTRACT

In an embodiment a lamp includes a lamp body extending in a first direction along a longitudinal axis between a proximal base portion and a light-reflective distal front surface, the distal front surface extending transverse to the longitudinal axis and having an outer edge and a linear array of a plurality of solid-state light sources arranged distally of the distal front surface of the lamp body, the linear array of solid-state light sources extending in a second direction transverse to the longitudinal axis and having a length in the second direction longer than a width across the second direction, wherein the light-reflective distal front surface tapers from the outer edge towards the linear array of solid-state light sources and comprises two opposed surface portions each extending from the outer edge to a linear inner edge line.

17 Claims, 6 Drawing Sheets

(56) References Cited

U.S. PATENT DOCUMENTS

| | | | |
|---|---|---|---|
| 2012/0241778 | A1 | 9/2012 | Franck et al. |
| 2013/0307399 | A1 | 11/2013 | Kim et al. |
| 2015/0247606 | A1 | 9/2015 | Gerlach et al. |

FOREIGN PATENT DOCUMENTS

| | | | |
|---|---|---|---|
| EP | 3099141 | A1 | 11/2016 |
| JP | 2017098056 | A | 6/2017 |

LAMP

CROSS-REFERENCE TO RELATED APPLICATIONS

This patent application is a national phase filing under section 371 of PCT/IB2022/051196, filed Feb. 10, 2022, which claims the priority of Italian patent application 102021000004478, filed Feb. 25, 2021, each of which is incorporated herein by reference in its entirety.

TECHNICAL FIELD

The present description relates to lamps.

One or more embodiments may be applied to lamps employing solid-state light sources, e.g., LED sources.

One or more embodiments may be advantageously employed in the automotive sector, for example as automotive retrofit lamps for motor vehicles.

BACKGROUND

In fields of use such as, for example, the automotive sector, light sources such as LED sources may offer various advantages compared to conventional lamps or bulbs.

For example, LED sources are brighter, quicker on power up and may easily be PWM modulated in order to adjust the intensity of the emitted light.

Another advantage derives from the fact that LED chips may be operated in an array, in parallel or in mixed configurations, and exhibit a rather long-time durable life.

Therefore, a growing trend has been observed towards developing and designing LED lamps which may be employed instead of conventional lamps, e.g., instead of halogen lamps, while being adapted to comply with specifications.

As a matter of fact, it is reasonable to foresee that in the near future automotive lamps will be replaced almost completely by LED lamps.

The known art concerning lamps having solid-state (e.g., LED) light sources is very vast. Reference may be made to documents such as DE 20 2012 012 007 U1, US 2011/0233578 A1, US 2012/0241778 A1, US 2015/0247606 A1, US 2015/0247606 A1, U.S. Pat. Nos. 5,160,200 A or 8,556,473 B2.

FIG. 1 is a perspective view of a solid-state W5 W retrofit lamp for motor vehicles, available from the companies of OSRAM group under the trade name W5 W 2880 CW.

Such a lamp, generally denoted with 10, includes a lamp body 12 extending along a longitudinal axis X10 between a proximal base portion 14 and a light-reflective distal front surface 16, which extends transverse to the longitudinal axis X10.

A light-permeable (e.g., plastics) dome member 18 is coupled to the lamp body 12, so as to define, with respect to surface 16, a light generation chamber 20.

A solid-state (LED) light source LS is arranged centrally on the reflective surface 16, which has a generally flat shape.

Source LS is supplied by circuitry 21 located in the lamp body 12 and made of a white plastic material, which supports, at surface 16, a printed circuit board (PCB) carrying the light source LS. A heat sink is coupled to the PCB in order to improve thermal dissipation.

Around source LS there is no specific optics element. The dome member 18 is adapted to perform optics functions, the curvature of dome member 18 helping reducing the amount of stray light at the interface between the air and the dome member.

Moreover, dome member 18 may be made of a light diffusive material, so as to smoothen the light beam output from lamp 10.

The light beam generated by a LED lamp as shown in FIG. 1 is not completely comparable to the light beam generated by a conventional filament lamp, both as regards efficiency and as regards the distribution of light intensity.

Specifically, it may be observed that the intensity distribution of a filament lamp provides a higher amount of light backwards (i.e., towards the bottom of the dome member 18) than a LED lamp as shown in FIG. 1 does, because in the latter lamp there are areas under the dome member 18 which are not lighted, with the consequent appearance of dark areas in the final application.

Moreover, the efficiency of a conventional filament lamp amounts to 75%, while a LED lamp as shown in FIG. 1 does not exceed 70%.

It is therefore desirable to implement lamps having solid-state light sources which are improved with respect to the aspects outlined above, so as to further favour meeting the specifications of ECE regulations as regards brightness, efficiency and light diffusion.

In this regard, reference may be made to ECE/324/Rev.1 regulations and, for the US market, to SAE FMVSS 564 regulations.

SUMMARY

One or more embodiments aim at contributing to provide lamps having solid-state light sources which are improved as regards the aspects outlined in the foregoing.

According to one or more embodiments, said object may be achieved thanks to a lamp having the features set forth in the claims that follow.

One or more embodiments may offer one or more of the following advantages:

- Keeping the same overall dimensions, without variations with respect to a conventional halogen lamp;
- Increasing efficiency as compared to a plastic body having a flat front surface, also thanks to the possibility of providing primary optics adapted to optimize the optical coupling between the light emitted from the source and the dome member; similar considerations also apply to the light distribution;
- Keeping the number of components low; the primary optics is part of the plastic body, therefore further optics components are not required; and
- The manufacturing process is not affected: the (e.g., plastics) lamp body may still be obtained by injection moulding, while only changing the shape of the mould.

The use of a solid-state, e.g., LED, filament as a light source offers further advantages:

- A possible reduction of the number of components; for example, the heat sink and the PCB are no longer provided as separate elements, because they are already "integrated" into the LED filament, and
- A simplification of the mounting operations which, thanks to the limited number of components, may be automated, with the consequent possibility of achieving high levels of mass production.

BRIEF DESCRIPTION OF THE DRAWINGS

One or more embodiments will now be described, by way of non-limiting example only, with reference to the annexed Figures, wherein.

It will be appreciated that, for simplicity and clarity of illustration, the various Figures may not be drawn to the same scale.

Moreover, for the sake of brevity, unless the context dictates otherwise, the similar parts or elements are denoted in the various Figures by the same reference symbols, without repeating the corresponding description for each Figure.

DETAILED DESCRIPTION OF ILLUSTRATIVE EMBODIMENTS

In the following description, various specific details are given to provide a thorough understanding of various exemplary embodiments according to the specification. The embodiments may be practiced without one or several specific details, or with other methods, components, materials, etc. In other instances, well-known structures, materials or operations are not shown or described in detail in order to avoid obscuring various aspects of the embodiments.

Reference throughout this specification to "one embodiment" or "an embodiment" means that a particular feature, structure or characteristic described in connection with the embodiment is included in at least one embodiment. Thus, the possible appearances of the phrases "in one embodiment" or "in an embodiment" in various places throughout this specification are not necessarily all referring exactly to the same embodiment. Furthermore, particular features, structures, or characteristics may be combined in any suitable manner in one or more embodiments.

The headings provided herein are for convenience only, and therefore do not interpret the extent of protection or scope of the embodiments.

In the Figures, reference number 10 generally denotes a lamp which may be employed, for example, for retrofitting, or optionally for the initial equipment of a light or headlight, not visible in the Figures.

It may be, for example, a solid-state W5 W retrofit lamp for motor vehicles.

Such a lamp has already been generally described with reference to FIG. 1.

Figure 1:
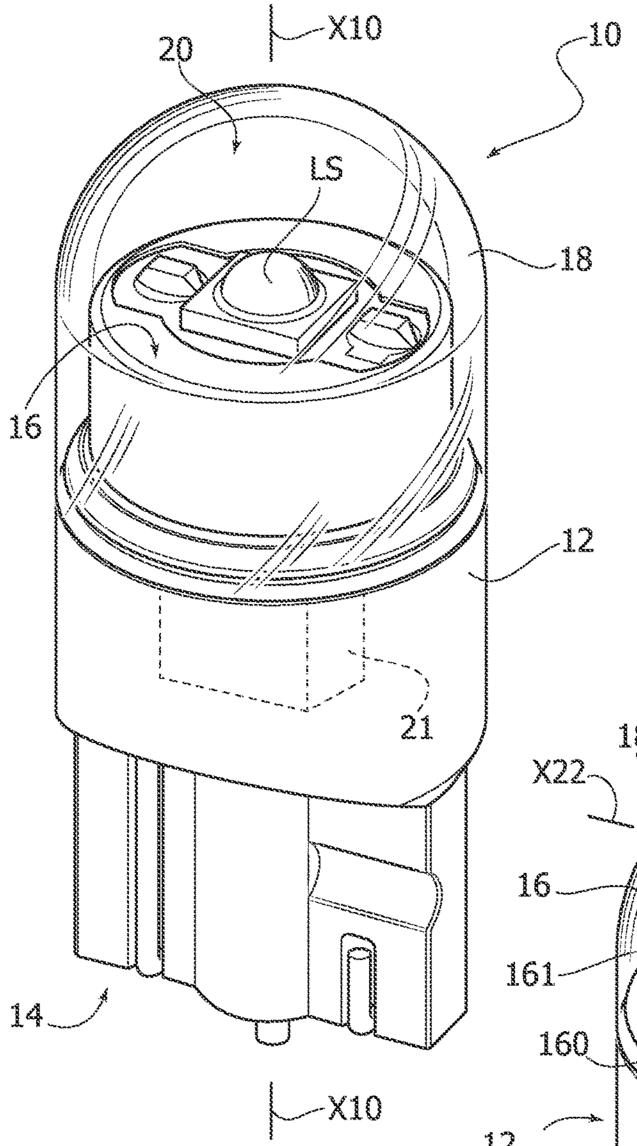
FIG. 1 shows a state of the art lamp.
Figure 2:
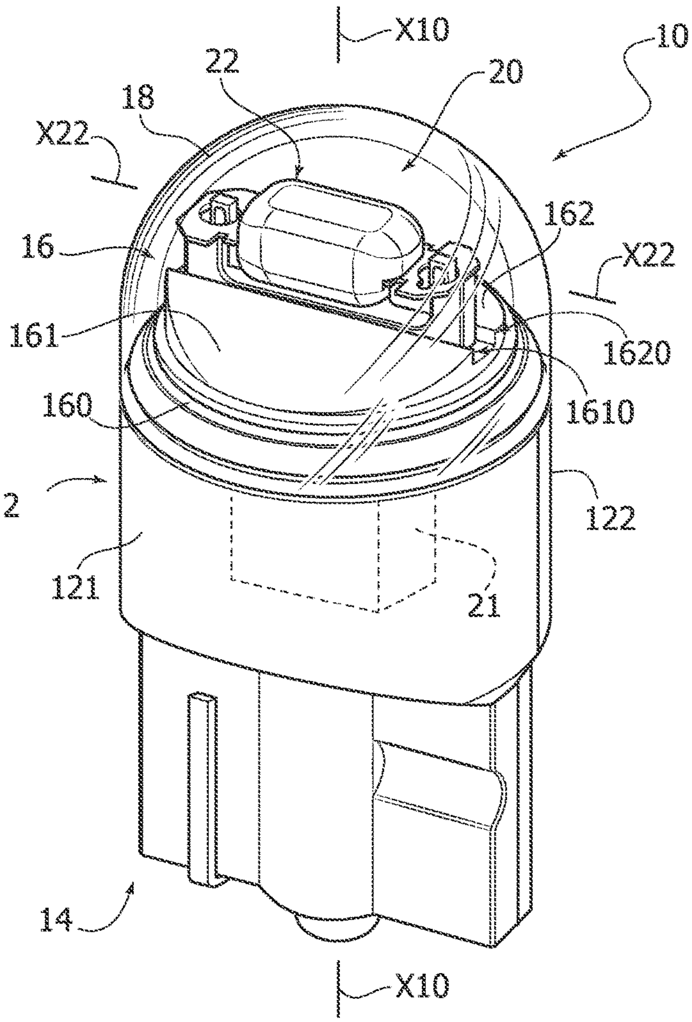
PRIOR ART FIG. 2
FIG. 2 is a perspective view of a lamp according to embodiments.

For the sake of brevity, and in order not to overburden the description, the following description is given "by difference", therefore assuming that, if the context does not indicate otherwise, the description of parts and elements provided with reference to FIG. 1 applies to corresponding parts and elements shown in FIG. 2 and following.

Therefore, unless the context dictates otherwise, similar parts or elements are denoted in the various Figures with the same reference symbols, without repeating a corresponding description for each Figure.

The lamp 10 depicted in FIG. 2 and following exemplifies an automotive solid-state lamp for a motor vehicle (not visible in the Figures).

Lamp 10 comprises a lamp body 12, e.g., of a moulded plastic material, extending along a longitudinal axis X10 between:

- a proximal base portion 14, being e.g., mushroom-shaped (see the lateral elevation view in FIG. 3), being adapted to be plugged into a headlight body (not visible in the drawings), and
- a light-reflective distal front surface 16.

The distal front surface 16 extends transverse to the longitudinal axis X10 and has an outer edge 160.

As exemplified herein, the outer edge 160 is substantially circular, and the part of the lamp body 12 adjacent to edge 160 has a generally cylindrical shape.

A light-permeable dome member 18 (for example of transparent plastic material) is coupled, for example via a snap fit connection, with the lamp body 12, so as to implement a light-generation chamber 20 at the reflective surface 16.

An array 22 of solid-state (e.g., LED) light sources 221 having an elongated linear shape is arranged centrally in the light-generation chamber 20, and therefore it is spaced from surface 16.

The array 22 of light sources extends in a direction X22 transverse to the longitudinal axis X10.

Unlike the solution in FIG. 1, wherein the surface 16 is substantially flat, in a lamp 10 as shown in FIG. 2 and following the reflective surface 16 tapers from the outer edge 160 towards the array 22 of light sources.

In a lamp 10 as shown in FIG. 2 and following, surface 16 includes two opposed portions 161, 162 having an "eyelid-like" shape.

Each of the portions 161, 162 as illustrated herein extends from the outer edge 160 (more specifically, from an edge or border line located at the outer edge 160) to a straight inner edge line 1610, 1620, aligned with the direction X22 of extension of source 22 (transverse to longitudinal axis X10).

As illustrated herein, portions 161, 162 are spaced from source 22.

As shown herein, portions 161, 162 have respective straight inner edge lines 1610, 1620, which are mutually distinct and separated by a space (see for instance FIG. 3) wherein electrical connection lines may be located which connect source 22 to circuitry 21.

As an alternative, the edge lines 1610, 1620 may merge into a peak edge of surface 16, while still keeping a general "pagoda" shape of surface 16, as can be appreciated in the Figures.

Figure 8:
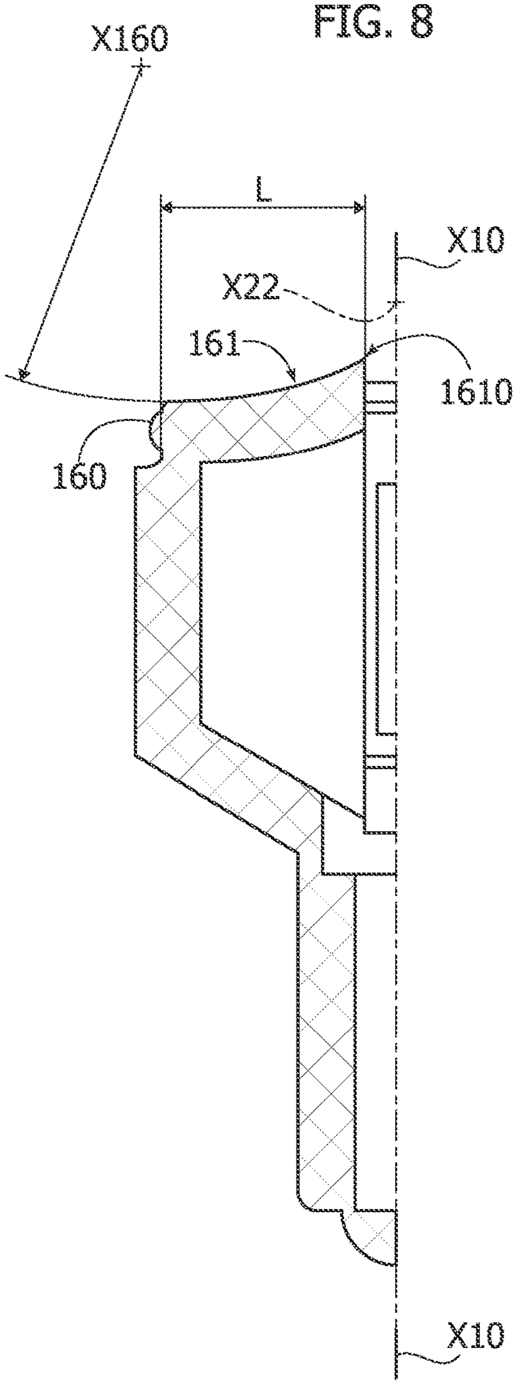
FIG. 8 is a partial section view along line VIII-VIII of FIG. 7.

As shown herein:

- the longitudinal axis X10 intersects the light source 22 at a median plane of source 22, and the two opposed portions 161, 162 of surface 16 are mirror-symmetrical with respect to said median plane,
- the two portions 161, 162 of surface 16 comprise concave curved surfaces, having the concavity thereof towards the array 22 of light sources,
- the two portions 161, 162 of surface 16 comprise (cylindrical) concave curved surfaces having axes of curvature (i.e., loci of the centres of curvature, X160: see for example FIG. 8) extending in the extension direction X22 of source 22, which is transverse to longitudinal axis X10, and The edge lines 1610, 1620 aligned with the direction X22 transverse to longitudinal axis X10 are longer than the array 22 in said transverse direction X22.

Such features as outlined in the foregoing, in a lamp 10 as shown in FIG. 2 and following, enable the efficiency and the distribution of light intensity of the lamp to approach the efficiency of the distribution of light intensity thanks to the presence of primary optics around the array of (LED) light sources, without increasing the size of the lamp (which may be kept within the ECE specifications) and/or without increasing the number of components, and without seriously affecting the manufacturing process. Indeed, the primary optics may be a part of the (e.g., plastics) body which carries the array 22 of light sources.

Figure 3:
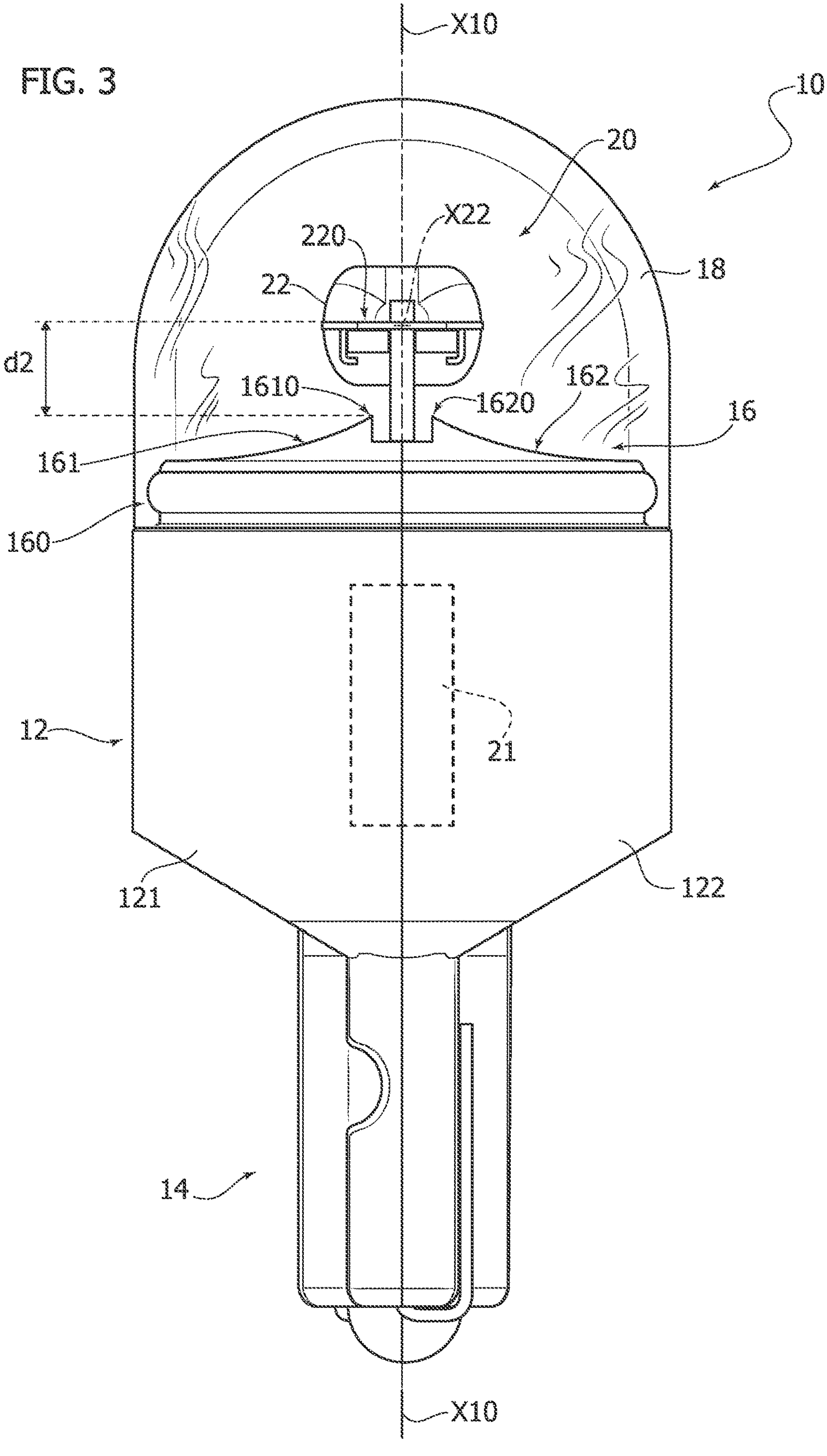
FIG. 3 is a lateral elevation view of a lamp as exemplified in FIG. 2.
Figure 4:
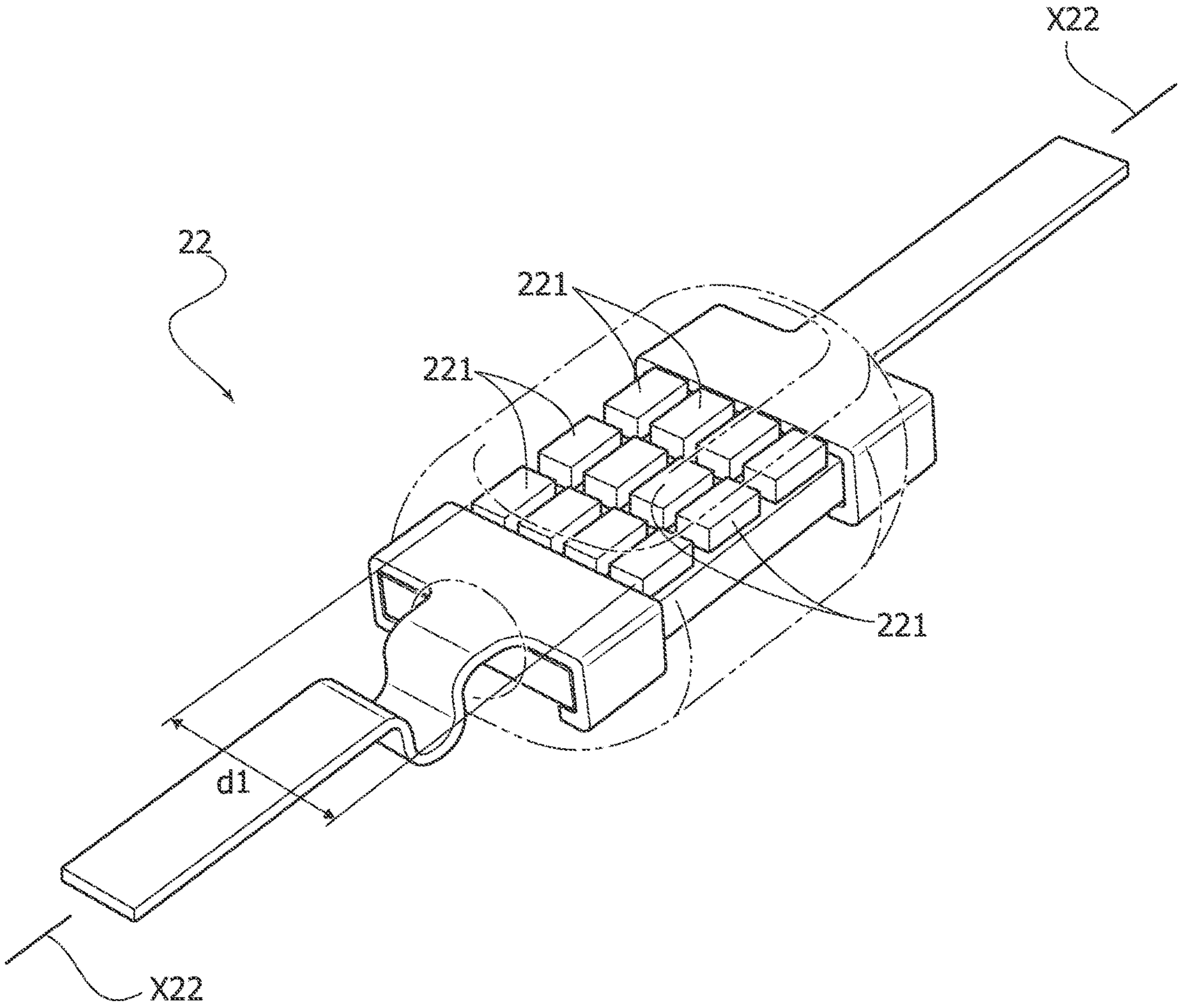
FIG. 4 is a perspective view of a lamp component according to embodiments.

A lamp 10 as shown in FIG. 2 and following may employ a "360°" array 22, as shown in FIG. 3.

As illustrated therein, array 22 comprises an elongated (more long than wide) array of solid-state (e.g., LED) light generators 221.

As illustrated herein, array 22 has a light-emitting area (LEA) in a light-emitting plane 220 (see for instance FIG. 3) perpendicular to longitudinal axis X10, and the inner edge lines 1610, 1620 of the two parts 161, 162 of distal surface 16 extend parallel to said light-emitting plane 220.

Said light-emitting area of array 22 may have a (maximum) width d1 of approximately 2.5 mm, across direction X22, and a length of approximately 4.5 mm, along direction X22.

As illustrated herein, the edge lines 1610, 1620 of the two portions 161, 162 of surface 16 extend at a distance d2 of approximately 2 mm from the light-emitting plane 220 of array 22.

It has been observed that the use of an array ("LED filament") of this kind, or of a source wider than a Lambertian light source, is advantageous because the intensity distribution, from the very beginning, is distributed over wider angles as compared to conventional Lambertian LED chips, therefore favouring the reduction of dark spots "under" source 22.

A source such as source 22 may adopt the solution described in EP 3 099 141 A1. This application is incorporated herein by reference in its entirety.

Specifically, LEDs 221 are embodied in a transparent body 222 (of a plastic material withstanding high temperatures), and therefore are carried by a transparent support, so that the light intensity is distributed and spread over angles wider with respect to a conventional Lambertian source.

The body 222 may be shaped in an approximately lenticular shape, so that the part of surface 16 which is closer to the LEDs 221 is adapted to act as primary optics, therefore implementing a shaping action on the light beam which is emitted "rearwards" towards the surface 16 at grazing angles, i.e., towards the body.

In this way it is possible to improve the optical coupling with the dome member 18, mainly by reducing Fresnel losses and back reflection at the interface between the air and the plastics dome, especially for grazing angles.

Figure 5:
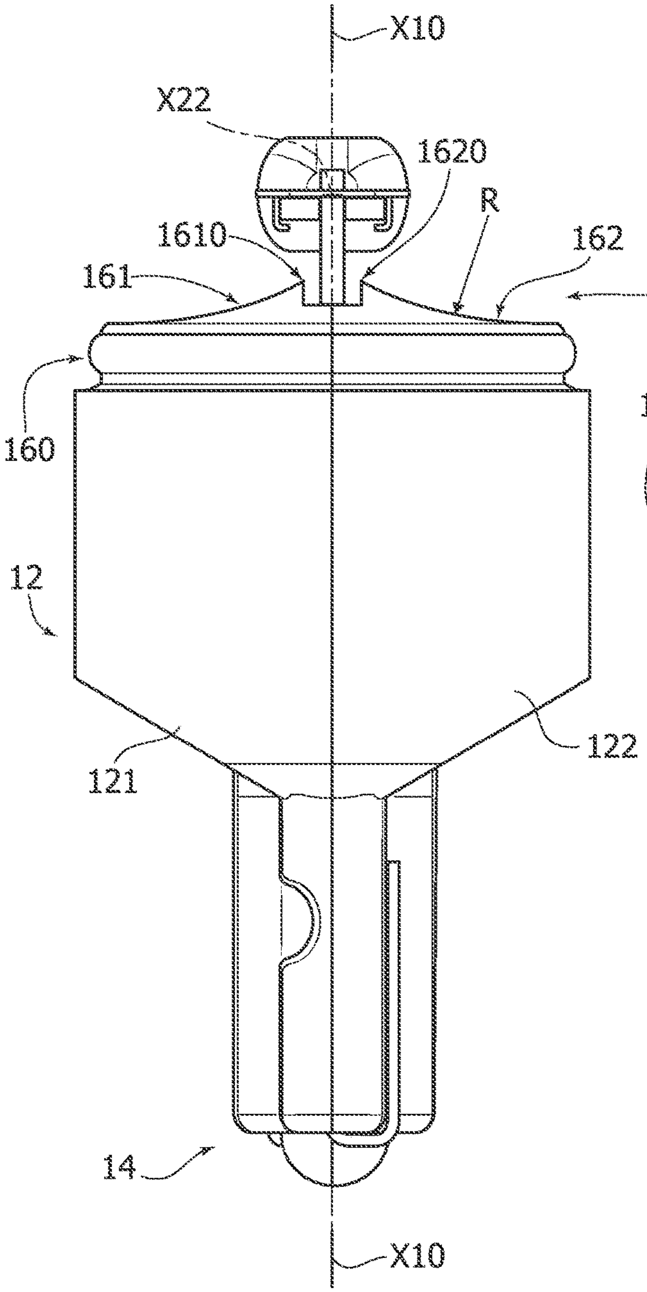
FIG. 5 is a view of a lamp as shown in FIG. 3, wherein some parts have been omitted for simplicity of illustration.

FIG. 5 refers to the lamp 10 shown without the dome member 18, so as to better highlight the features of surface 16 and of the portions 161, 162 thereof.

FIG. 5 highlights the fact that, in a lamp 10 as illustrated herein, the (cylindrical) curved surfaces 161, 162 are mirror-symmetrical with respect to the median longitudinal plane of source 22, which passes through axis X10, and have a radius of curvature R.

Figure 6:
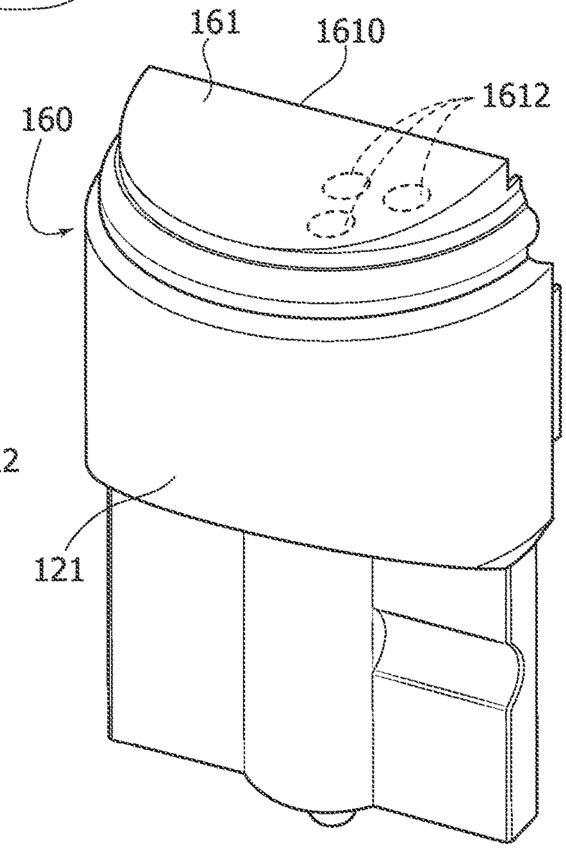
FIG. 6 is a perspective view of a lamp component according to embodiments.

As shown in FIG. 6, each of the parts 121, 122 of the lamp body 12 may implemented as a (e.g., moulded plastics) shell piece, wherein one of the portions 161, 162 is formed at a respective end position.

Specifically, FIG. 6 is a perspective view of the part 121, wherein portion 161 is formed at the end position.

FIG. 6 highlights the fact that portions 161, 162 may comprise micro-optics formations 1612 (so-called "pillows" which may be extruded and may have a cylindrical, circular, hexagonal or other shape) having an average size of about 1.5 mm.

Figure 7:
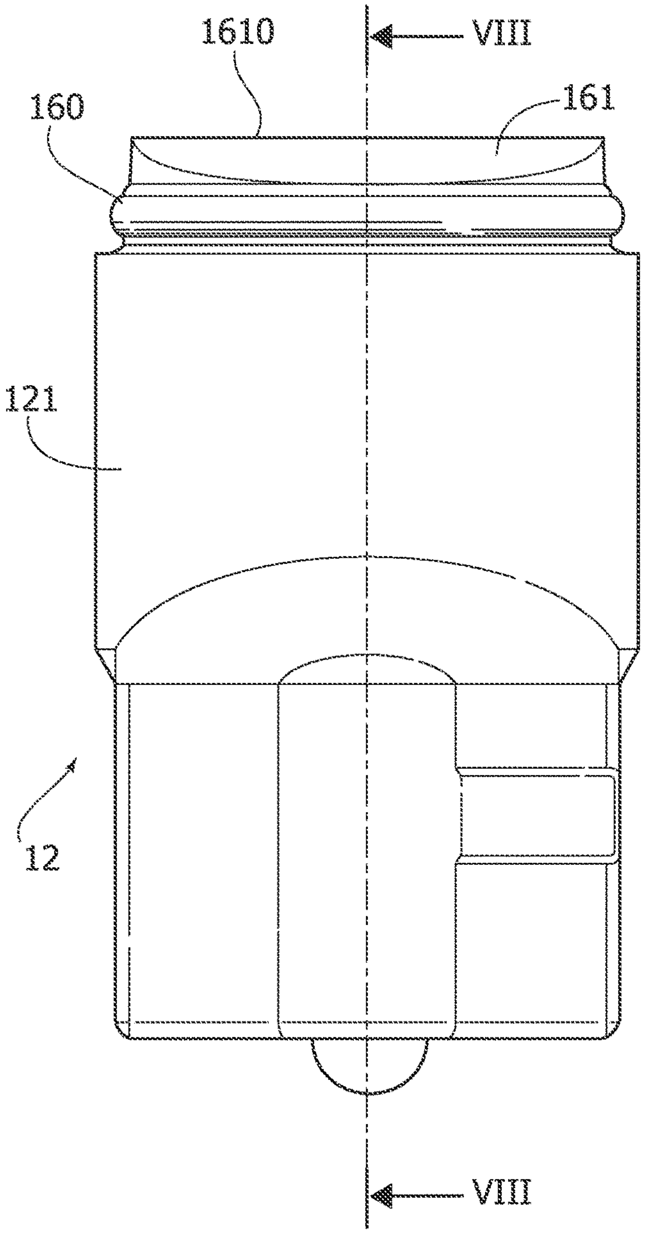
FIG. 7 is a view of a lamp as shown in FIG. 3, rotated by 90°, wherein further parts have been omitted for simplicity of illustration.

FIG. 7 shows the lamp body 10 rotated by 90°, with the omission of further parts for simplicity of illustration.

FIG. 8 is a partial sectional view (specifically only of part 121 of body 12) along line VIII-VIII of FIG. 7, further highlighting the possibility of implementing parts 121, 122 of the lamp body 12 as a (e.g., moulded plastics) shell piece, wherein, at an end position, there is respectively provided one of the portions 161, 162, the parts 121, 122 being adapted to be mutually coupled, e.g. by electric welding, the dome member 18 being then applied and fitted onto parts 121, 122 at the reflective front surface 16.

FIG. 8 highlights the fact that, in a lamp 10 as described herein:

the lamp body has a radial dimension L at the reflective surface 16, and the (cylindrical) curved surfaces of portions 161, 162 have axes of curvature (loci of the centres of curvature) X160 extending in the extension direction of source 22 (the direction X22 transverse to the longitudinal axis X10) at a distance from longitudinal axis X10 which is approximately equal to said radial dimension L of the lamp body 12. For simplicity of illustration, the Figure only shows, denoted as X160, the axis (of curvature) of the cylindrical surface whereon the portion 161 of surface 16 is located. As has already been mentioned, in a lamp 10 as illustrated herein, the surfaces 161, 162 are mirror-symmetrical with respect to the median longitudinal plane of source 22 passing through axis X10. What has already been stated with reference to portion 161 as per FIG. 8 is symmetrically true for portion 162.

The following Table I exemplifies possible values of ratio R/L, and therefore the value (expressed in mm) of the radius R of curvature of the cylindrical surfaces 161, 162 of reflective surface 16 (primary optics), considering that, for retrofit purposes, the value of L is fixed at 3.93 mm.

TABLE I values R, L and R/L

| R [mm] | L [mm] | R/L |
|---|---|---|
| 20 | 3.93 | 5.08 |
| 15 | 3.93 | 3.81 |
| 10 | 3.93 | 2.54 |
| 8 | 3.93 | 2.03 |
| 7 | 3.93 | 1.78 |
| 6 | 3.93 | 1.52 |
| 5 | 3.93 | 1.27 |
| 4 | 3.93 | 1.01 |

A suitable range of variation of the radius of the cylindrical surface of portions 161, 162 is from 20 mm to 4 mm.

The selection of a value of approximately 8 mm has been proven advantageous.

Figure 9A:
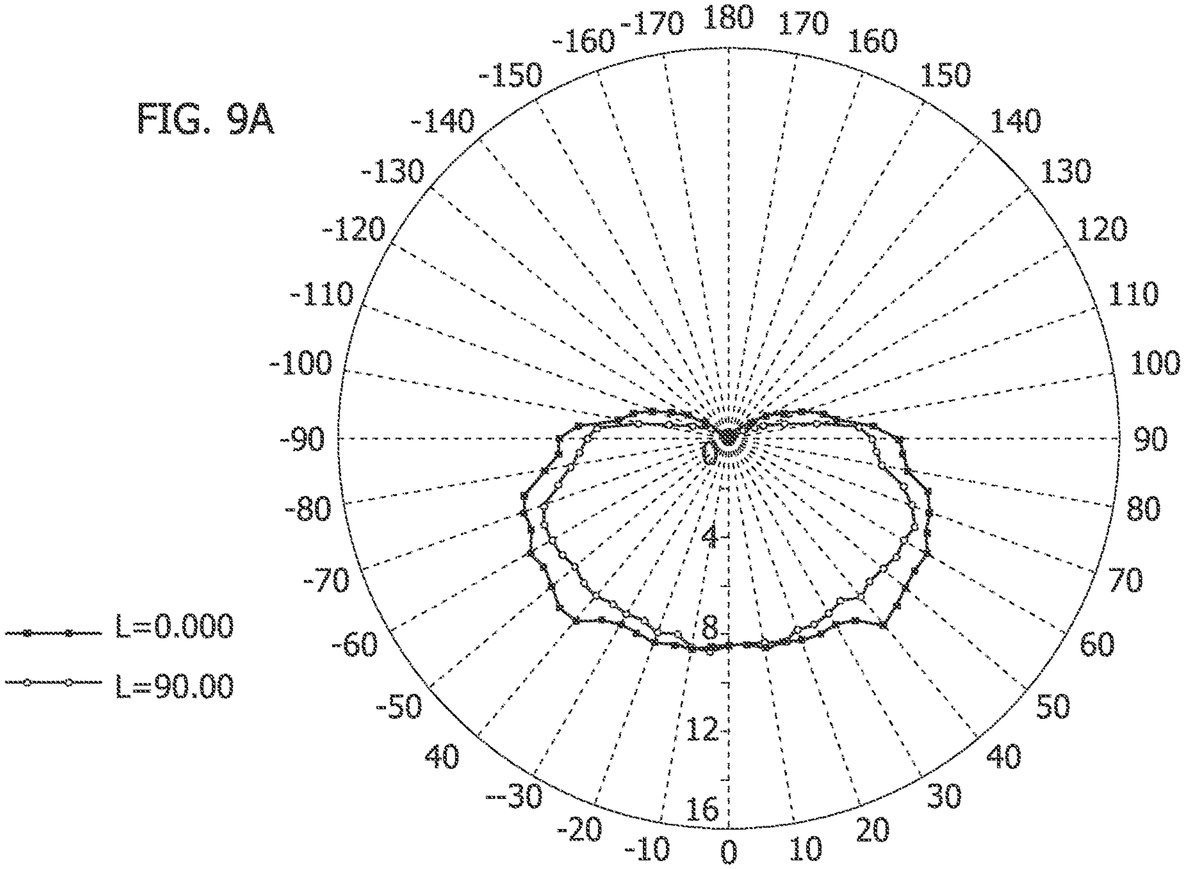
FIGS. 9A and 9B are diagrams showing operating features of a lamp according to embodiments (FIG. 9B) as opposed to solutions taken as a reference (FIG. 9A).
Figure 9B:
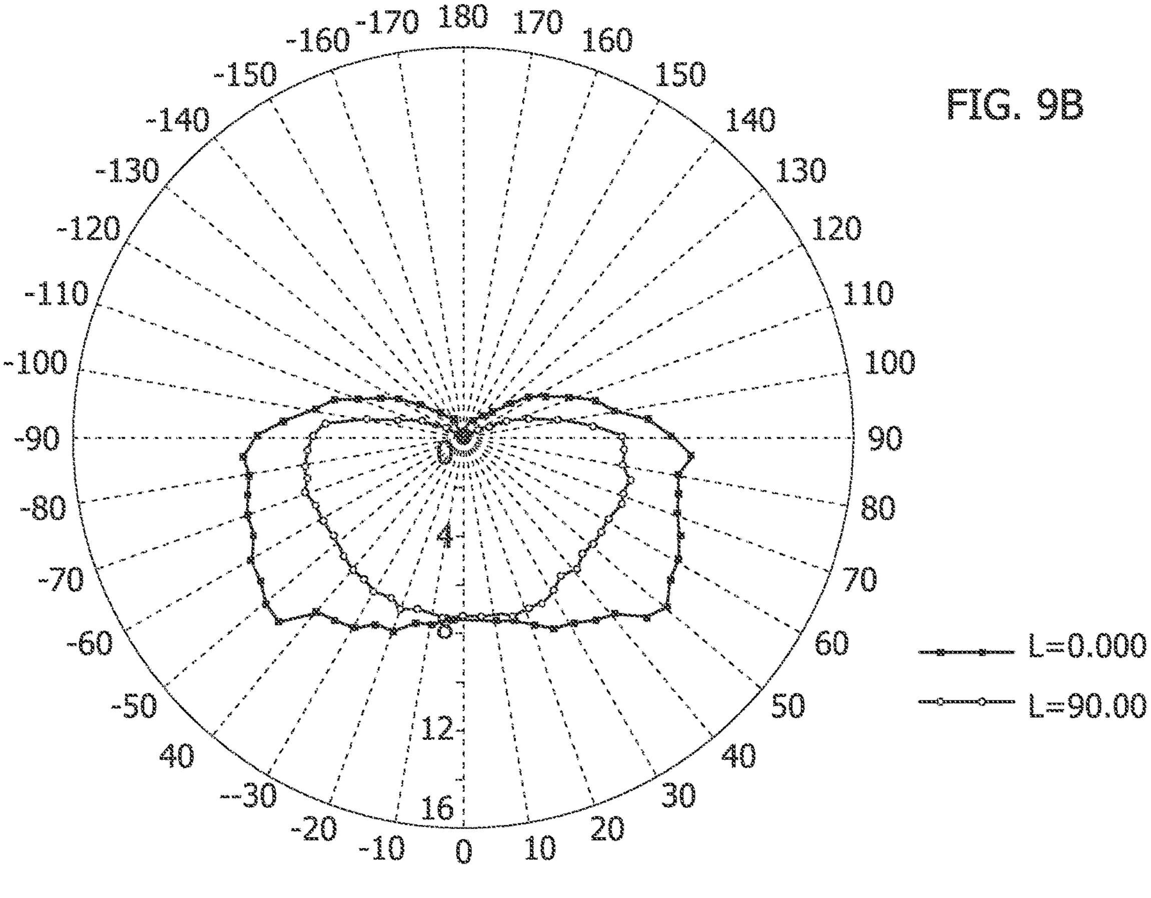

FIGS. 9A and 9B are simulation diagrams obtained with the simulation tool Light Tools available from Synopsys, Inc. of Mountain View, CA (USA) in order to verify the improvement which may be achieved by implementing, for the area under the LED filament (array 22), instead of a flat surface 16 (i.e., substantially as shown in FIG. 1), a curved geometry, i.e., with convex portions 161, 162 and with a cylindrical surface, as described in the foregoing.

The diagrams in FIGS. 9A and 9B show the simulated distribution of the light intensity (in the two planes C, expressed in arbitrary units) in the case of:

- a flat surface 16 (standard plastics body), i.e., in a condition wherein the light of the LED filament in practice is not distributed backwards, i.e., at grazing angles, below the light source (FIG. 9A), and
- a tapered surface 16, with the two portions 161, 162 as described with reference to FIG. 2 and following (FIG. 9B).

In the latter case, the data were obtained with cylindrical surfaces 161, 162 having a radius R=8 mm (see FIG. 8).

As stated in the foregoing, this is advantageous for various reasons:

- this geometry favours shaping the front surface 16 of the (e.g., plastics) body 12 while keeping the overall dimensions thereof unvaried and leaving sufficient space for mounting source 22,
- moreover, this shape enables to manufacture the plastics body 12 by injection moulding, by simply opening the mould and without further movements (due to inserts).

The efficiency calculated in both cases was respectively 0.660024 (FIG. 9A) and 0.72710 (FIG. 9B).

Without a specific optical treatment/coating, i.e., with the body 12 of white plastics (which is usually polycarbonate, because it makes it easier to obtain the body 12 by injection moulding), the surface 16 has a reflectivity of about 50%, leading to the efficiency values of 66% and 72% mentioned in the foregoing.

Moreover, it has been observed that the advantages deriving from implementing a tapered surface 16 and the two portions 161, 162, as described with reference to FIG. 2 and following, may be enhanced if reflectivity is higher.

The following Table II presents, for different reflectivity values of surface 16 (left column), calculated rounded efficiency values (obtained by using the tool mentioned in the foregoing) for a flat surface 16 and for a "curved" surface 16, i.e., a tapered surface 16 having both portions 161, 162 as described with reference to FIG. 2 and following. Said efficiency values are presented in the two right columns of the Table.

TABLE II

Reflectivity vs. Efficiency

| | Efficiency % | |
|---|---|---|
| Reflectivity % | Flat surface 16 | Curved surface 16 |
| 50 | 66 | 72 |
| 60 | 68 | 74 |
| 85 | 73 | 78 |
| 95 | 76 | 81 |

Also, with a plastics white body below the LED filament (array 22), a (concave) curved profile of portions 161, 162 provides an intensity distribution with a higher amount of light diffused backwards, and therefore the efficiency outside dome member 18 with a body 12 of standard white plastics amounts to 72%. Said value is comparable to the efficiency of a conventional filament lamp. The higher efficiency (compared with a flat surface 16) is due to a better optical coupling between the light rays emitted by the LED filament (source 22) and the dome member 18, especially for the rays emitted backwards towards the plastics body 11, and as a consequence due to lower Fresnel losses at the air/dome interface.

In other words, the reflective surface 16 acts as primary optics, and improves the optical coupling of the rays of source 22 with the dome member 18.

As shown in Table II, the efficiency of lamp 10 is further improved if the front surface 16 of body 12 is subjected to an optical treatment in order to improve the reflectivity thereof.

The reflectivity may be improved by treatments which are known to the experts in the field and which may be carried out, e.g., on the mould or through additional coatings.

For example, as illustrated with reference to FIG. 6, the portions 161, 162 of surface 16 may be provided with micro-optics formations 1612.

A suitable optical treatment of surface 16 helps achieving reflectivity values of 80-85%. With a reflectivity of 85%, the efficiency of the lamp 10 as illustrated herein may reach values of about 78%, which are higher than those of a conventional filament lamp.

TO summarize, a solid-state lamp (e.g., 10) for a vehicle (for example for motor vehicles), as illustrated herein by way of example, comprises:

- a lamp body (e.g., 12) extending in a first direction along a longitudinal axis (e.g., X10) between a proximal base portion (e.g., 14) and a light-reflective distal front surface (e.g., 16), the distal front surface (16) extending transverse to the longitudinal axis and having an outer edge (e.g., 160),
- a linear array (e.g., 22) of a plurality of solid-state light sources (e.g., 221) arranged distally of the distal front surface of the lamp body (12), the linear array of solid-state light sources extending in a second direction (e.g., X22) transverse to said longitudinal axis and having along said second direction (X22) a length longer than a width across said second direction (i.e., a shape elongated in the direction denoted as X22).

In a lamp 10 as illustrated herein, the light-reflective distal front surface tapers from said outer edge towards the linear array of solid-state light sources and comprises two opposed surface portions (e.g., 161, 162) each extending from said outer edge to a linear inner edge line (straight line, e.g., 1610, 1620), wherein the linear inner edge line is:

- aligned with said second direction (e.g., X22) transverse to said longitudinal axis and longer than the length of the linear array of solid-state light sources in said second direction, and
- spaced (see, for example, d2 in FIG. 3) from the linear array of solid-state light sources towards the proximal base portion of the lamp body in said first direction (i.e., in the direction of axis X10).

In a lamp as illustrated herein, said longitudinal axis (i.e., X10) intersects a portion of the linear array of solid-state light sources.

In a lamp as illustrated herein, said longitudinal axis intersects the linear array of solid-state light sources at a median plane of the array.

In a lamp as illustrated herein, the two opposed surface portions of the light-reflective distal front surface are mirror-symmetrical with respect to said median plane.

In a lamp as illustrated herein, the (straight) linear inner edge lines of said opposed surface portions (i.e., 161, 162) lie on opposite sides of said median plane at a distance from the longitudinal axis (i.e., X10).

In a lamp as illustrated herein, said two opposed surface portions comprise concave curved surfaces having the concavity thereof towards the linear array of solid-state light sources.

In a lamp as illustrated herein, said curved surfaces have axes of curvature (i.e., loci of the centers of curvature, X160) extending in said second direction transverse to said longitudinal axis.

In a lamp as illustrated herein, said curved surfaces have a radius of curvature of between approximately 4 mm and approximately 20 mm, optionally of approximately 8 mm.

In a lamp as illustrated herein:

the lamp body has a radial dimension (see, for example, L in FIG. 8) from the longitudinal axis to the outer edge of the light-reflective distal front surface, said curved surfaces have axes of curvature extending in said second direction transverse to said longitudinal axis at a distance from said longitudinal axis approximately equal to said radial dimension of the lamp body (in this regard, always refer to FIG. 8).

In a lamp as illustrated herein, said curved surfaces (i.e., 161, 162) are cylindrical surfaces.

In a lamp as illustrated herein, the surface portions of the light-reflective distal front surface comprise micro-optics formations (see, for example, the pillows 1612 in FIG. 6) having an average size of approximately 1.5 mm.

In a lamp as illustrated herein, the linear array of solid-state light sources has a light-emitting area in a light-emitting plane (e.g., 220) orthogonal to said longitudinal axis, the (straight) inner edge lines of the two opposed surface portions of the light-reflective distal front surface extend parallel to the light-emitting plane of the light-emitting area of the linear array (22) of solid-state light sources.

In a lamp as illustrated herein, the light-emitting area of the linear array of solid-state light sources has a maximum width (e.g., d1) across said second direction of approximately 2.5 mm.

In a lamp as illustrated herein, the linear inner edge lines (straight lines 1610, 1620) of the two opposed surface portions of the light-reflective distal front surface are spaced in said first direction (i.e., in the direction of axis X10) by a distance (e.g., d2 in FIG. 3) of approximately 2 mm from the light-emitting plane of the light-emitting area of the linear array of solid-state light sources.

A lamp as illustrated herein comprises a cover member (e.g., dome 18) coupled to the lamp body and configured to cover the linear array of solid-state light sources. Said cover member comprises an end region (e.g., 180) intersected by said longitudinal axis distally of the linear array of solid-state light sources, and the cover member is light-permeable (at least) at said end region.

In a lamp as illustrated herein, the linear array of solid-state light sources comprises a linear array of LEDs (e.g., 221).

Without prejudice to the basic principles, the implementation details and the embodiments may vary, even appreciably, with respect to what has been illustrated herein by way of non-limiting example only, without departing from the extent of protection.

The invention claimed is:

1. An automotive solid-state lamp comprising:

a lamp body extending in a first direction along a longitudinal axis between a proximal base portion and a light-reflective distal front surface, the light-reflective distal front surface extending transverse to the longitudinal axis and having an outer edge; and a linear array of solid-state light sources arranged distally of the light-reflective distal front surface of the lamp body, the linear array of solid-state light sources extending in a second direction transverse to the longitudinal axis and having a length in the second direction longer than a width across the second direction, wherein the linear array of solid-state light sources has a light-emitting area in a light-emitting plane orthogonal to the longitudinal axis, wherein the longitudinal axis intersects a portion of the linear array of solid-state light sources, wherein the light-reflective distal front surface is arranged between the linear array of solid-state light sources and the proximal base portion, wherein the light-reflective distal front surface tapers from the outer edge towards the linear array of solid-state light sources and comprises two opposed surface portions each extending from the outer edge to a linear inner edge line, wherein the linear inner edge line is:

aligned with the second direction transverse to the longitudinal axis and longer than the length of the linear array of solid-state light sources in the second direction, and spaced from the linear array of solid-state light sources towards the proximal base portion of the lamp body in the first direction, and wherein the linear inner edge lines of the two opposed surface portions of the light-reflective distal front surface extend parallel to the light-emitting plane of the light-emitting area of the linear array of solid-state light sources.

2. The lamp of claim 1, wherein the longitudinal axis intersects the linear array of solid-state light sources at a median plane of the linear array of solid-state light sources.

3. The lamp of claim 2, wherein the two opposed surface portions of the light-reflective distal front surface are mirror-symmetrical with respect to the median plane.

4. The lamp of claim 2, wherein the linear inner edge lines of the opposed surface portions lie on opposite sides of the median plane at a distance from the longitudinal axis.

5. The lamp of claim 1, wherein the two opposed surface portions comprise concave curved surfaces having a concavity thereof towards the linear array of solid-state light sources.

6. The lamp of claim 5, wherein the curved surfaces have axes of curvature extending in the second direction transversely to the longitudinal axis.

7. The lamp of claim 5, wherein the curved surfaces have a radius of curvature of between approximately 4 mm and approximately 20 mm, inclusive.

8. The lamp of claim 7, wherein the curved surfaces have a radius of curvature of approximately 8 mm.

9. The lamp of claim 5, wherein the lamp body has a radial dimension from the longitudinal axis to the outer edge of the light-reflective distal front surface, and wherein the curved surfaces have axes of curvature extending in the second direction transverse to the longitudinal axis at a distance to the longitudinal axis approximately equal to the radial dimension of the lamp body.

10. The lamp of claim 5, wherein the curved surfaces are cylindrical surfaces.

11. The lamp of claim 1, wherein the surface portions of the light-reflective distal front surface comprise micro-optics formations having an average size of approximately 1.5 mm.

12. The lamp of claim 1, wherein the light-emitting area of the linear array of solid-state light sources has a maximum width of approximately 2.5 mm across the second direction.

13. The lamp of claim 12, wherein the linear inner edge lines of the two opposed surface portions of the light-reflective distal front surface are spaced in the first direction by a distance of approximately 2 mm from the light-emitting plane of the light-emitting area of the linear array of solid-state light sources.

14. The lamp of claim 1, further comprising:

a cover coupled to the lamp body, the cover configured to cover the linear array of solid-state light sources, wherein the cover comprises an end region intersected by the longitudinal axis distally of the linear array of solid-state light sources, and wherein the cover is light-permeable at the end region.

15. The lamp of claim 14, wherein the cover is coupled with the lamp body so as to implement a light-generation chamber at the light-reflective distal front surface, and wherein the linear array of solid-state light sources is arranged in the light-generation chamber and spaced from the light-reflective distal front surface.

16. The lamp of claim 15, wherein the linear array of solid-state light sources is arranged centrally in the light-generation chamber.

17. The lamp of claim 1, wherein the linear array of solid-state light sources comprises a linear array of LEDs.

* * * * *